United States Patent [19]

Carse

[11] Patent Number: 4,467,943

[45] Date of Patent: Aug. 28, 1984

[54] LIQUID DISPENSING VALVE ASSEMBLY

[76] Inventor: Clifford C. Carse, 500 Woodcrest Ct., Boulder City, Nev. 89005

[21] Appl. No.: 398,775

[22] Filed: Jul. 15, 1982

[51] Int. Cl.³ .............................................. G01F 11/06

[52] U.S. Cl. .................................... 222/309; 222/341; 222/334; 91/319

[58] Field of Search ............... 222/309, 341, 340, 373, 222/263, 283, 334, 207, 209; 91/304, 313, 265, 244, 319

[56] References Cited

U.S. PATENT DOCUMENTS

| | | | |
|---|---|---|---|
| 3,853,245 | 12/1974 | Branch et al. | 222/341 X |
| 3,979,023 | 9/1976 | Hartley | 222/309 X |
| 4,157,772 | 6/1979 | Carse | 222/309 X |

*Primary Examiner*—Joseph J. Rolla
*Assistant Examiner*—G. Pyryt
*Attorney, Agent, or Firm*—Seiler, Quirk & Tratos

[57] ABSTRACT

An improved solenoid valve assembly for opening and closing a pressurized gas inlet for dispensing liquid from a dispensing apparatus comprises an enlarged relatively low pressure recess to which the solenoid plunger is exposed to automatically maintain the gas pressure inlet open until a full measure of liquid has been dispensed.

8 Claims, 5 Drawing Figures

LIQUID DISPENSING VALVE ASSEMBLY

BACKGROUND OF THE INVENTION

In my prior U.S. Pat. No. 4,157,772, there is disclosed an apparatus for dispensing liquor from a bottle to a hand-held nozzle for preparing or mixing a drink. A number of similar dispensing units have been proposed and utilized commercially incorporating a hand-held dispenser gun or nozzle having a plurality of buttons thereon for selecting the type of liquor to be dispensed and cooperating with a solenoid valve which operates a piston for directing liquor from a chamber to the dispensing gun. In such prior apparatus the solenoid core or plunger is moved in both directions for starting and stopping the dispensing of liquor from the apparatus. When the operator first presses a button on the dispensing gun liquid begins to flow as a piston is depressed by pressurized gas introduced into the apparatus, and liquid flow is terminated when the operator releases the button. Since a specific and predetermined amount of liquid is to be automatically dispensed, if the operator inadvertently releases the button before the piston has been completely depressed to displace the intended amount of liquor, a "short pour" or inadequate amount of liquor is dispensed. Other dispensing units, attempting to obviate such a disadvantage have utilized a system in which the solenoid plunger remains in the open or activated position to allow full measure dispensing until the piston has become fully depressed thereby displacing all of the liquid in the cylinder, and in such a fully depressed position actuates or trips a switch for terminating voltage to the solenoid. Such additional switching not only complicates the system but increases manufacturing and maintenance costs. It is to the elimination of these disadvantages that the improvement of the present invention is directed.

SUMMARY OF THE INVENTION

In the present invention an improved solenoid assembly is utilized which includes an oversized recess formed on a gas pressure exhaust cap which cooperates with the solenoid plunger to keep the plunger in the actuated position so long as pressurized gas is in the system. A pressure system release passage is opened when the liquid dispensing piston is fully depressed whereupon the solenoid plunger is automatically returned to its original position. With such an improvement, an operator need only initially depress a button on the hand-held liquid dispenser gun and regardless of when the button is released, whether immediately or after a short period of time, the specific predetermined amount of liquor will be dispensed without requiring additional switching or solenoid activation or deactivation. The components of the invention as well as its advantages will be evident from the following detailed description.

DETAILED DESCRIPTION OF THE INVENTION

Figure 1:
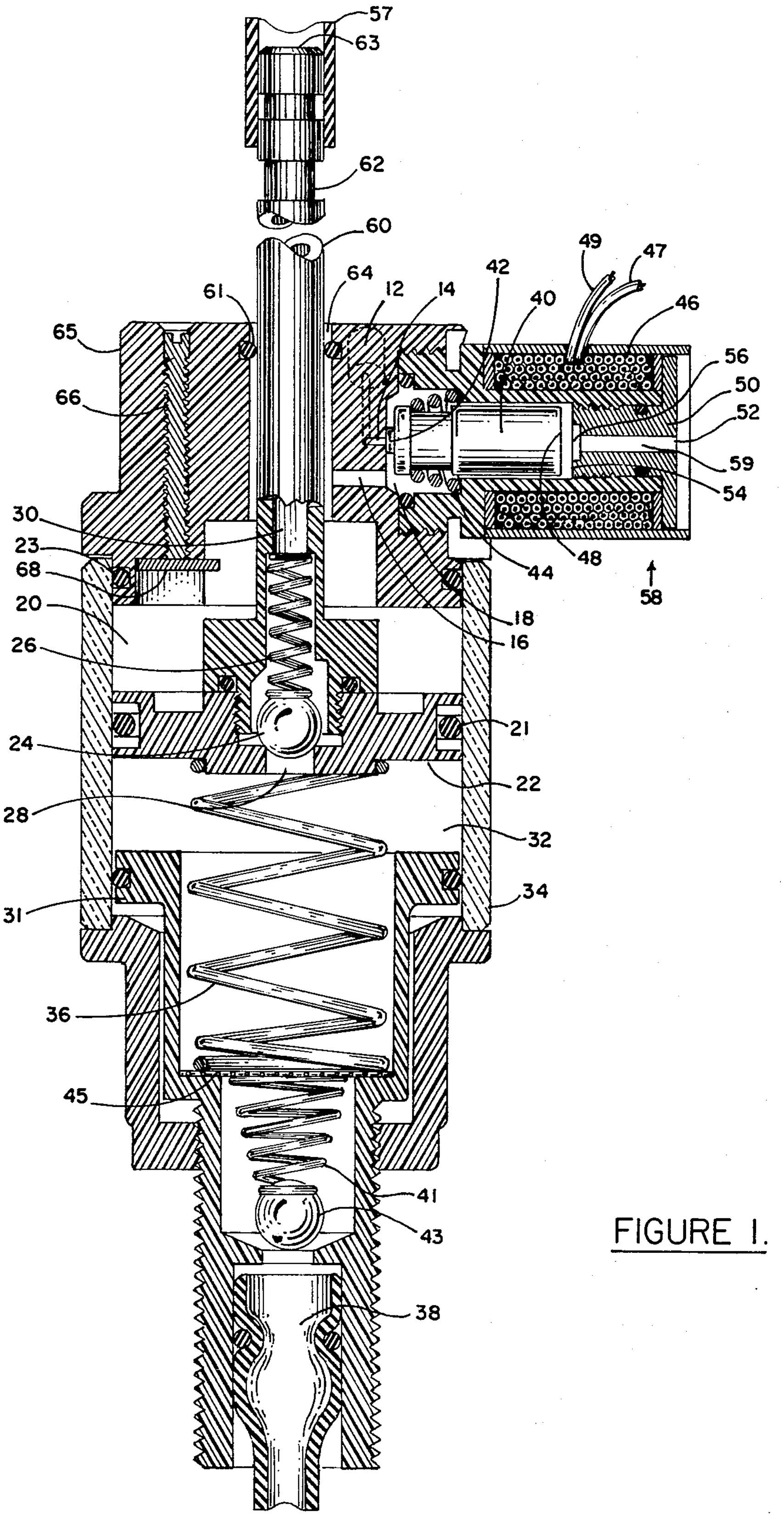
FIG. 1 is a sectional view illustrating in detail the components of dispensing apparatus of the invention.

As illustrated in the drawings, the apparatus of the present invention comprises an assembly of components for dispensing liquor or other liquid in a predetermined amount, normally between about ½ to about 1½ ounces. Referring particularly to FIG. 1, cylinder 34 provides a cavity 32 which holds a predetermined amount of liquid. Liquid is supplied to the cavity via liquid inlet conduit 38. Within the liquid holding cavity 32 piston 22 is movable reciprocally between positions shown in FIGS. 2 and 4, there being a fluid seal provided by O-ring 21 between the interior wall of the cylinder and the piston. Preferably, cylinder 34 is removable from housing 65 for ease in manufacturing, assembly and maintenance of the assembly. O-ring 23 maintains a fluid-tight seal between the cylinder and housing components. The cylinder may be glass, or more preferably an unbreakable plastic material which is also relatively transparent, such as a polymethacrylate polymer (Plexiglass), or the like.

Solenoid assembly 58 is secured to housing 65 for controlling the flow of pressurized gas into the apparatus. Typical solenoid assembly components include plunger 40 having a stopper 42 secured at the foward end for closing gas inlet port 14. A solenoid plunger spring 44 urges plunger 40 to the inactivated position shown in FIGS. 1, 2 and 4 to close gas inlet port 14. Solenoid plunger 40 is retracted to the position illustrated in FIG. 3 when a electrical current is passed through wiring coil 46. Lead wires 47 and 49 extending from wire coil 46 to suitable switches in a hand-held dispenser gun (not shown) are for operating the solenoid valve in response to depression of buttons on such a dispenser gun by an operator.

Figure 4:
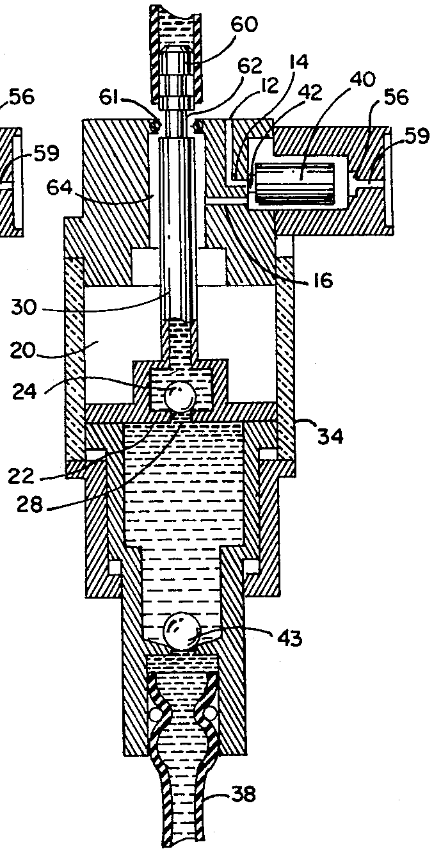

Pressurized gas, commonly $CO_2$, is introduced into the apparatus via gas inlet conduit 12 which is suitably connected to a source of pressurized gas. Such gas will pass through inlet port 14 to cavity 18, and through passageway 16 into main cavity 20, where it will exert pressure against the upper side of piston 22 thereby driving it downwardly. Pressure relief port 64 is closed as O-ring 61 maintains a gas-tight seal with the outer surface of piston guide shaft 60. This gas seal will be maintained when piston 22 is in all positions, between the retracted position in FIG. 2, during its travel between that position and the fully depressed illustrated in FIG. 4. Once the piston has been fully depressed whereby substantially all of the liquid in cavity 32 has been displaced and with the piston against bottom plate 31, notch 62, which extends around at least a portion of the outer surface of piston guide shaft 60 adjacent upper end 63, is exposed to O-ring 61 and provides an opening for the escape of gas through gas pressure relief port 64. That position is illustrated in FIG. 4.

Figure 2:
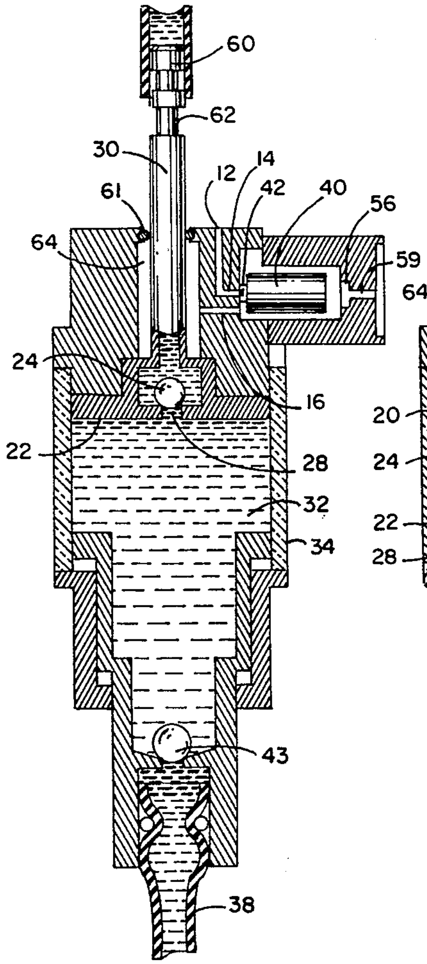
FIGS. 2, 3 and 4 are simplified views of the apparatus illustrating its operation.
Figure 3:
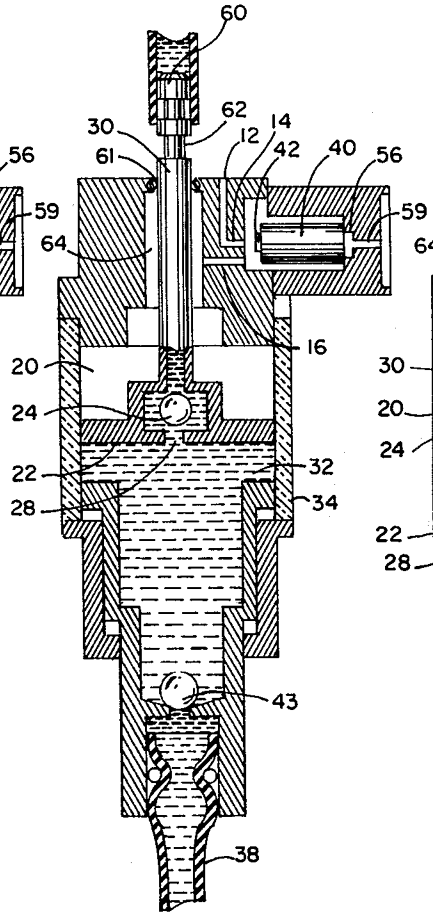

In the initial position illustrated in FIG. 2, with the piston retracted, and cavity 32 filled with liquid, solenoid plunger 40 is inactivated and closes gas inlet port 14. When an operator depresses a button on a hand-held dispensing gun causing a current to flow through the solenoid coil 46, the solenoid plunger is retracted to the position illustrated in FIG. 3, against the bias of spring 44 whereby pressurized gas enters into the system via gas inlet port 14. Under such pressure, piston 22 is depressed against the bias of spring 36 as illustrated in FIG. 3. As the piston is depressed, liquid forces downwardly biased ball 24 upwardly thereby opening the liquid dispensing port 28. Unless the piston is being depressed, ball valve 24 is biased against valve seat at port 28 by spring 26. The liquid is then forced out of the assembly via liquid outlet passageway 30 extending along the interior of piston guide shaft 60. The top of the shaft is secured to a suitable tubing 57 which extends between the assembly and a dispensing gun. When the current through solenoid coil 46 is terminated, spring 44 tends to force the plunger back to the inactivated position, which would close off gas inlet port 14 and cause pressurization of the system to stop thereby prematurly interrupting the depression of piston 22 and terminate the dispensing of liquid. It is precisely this problem that the improvement of the present invention avoids.

Figure 5:
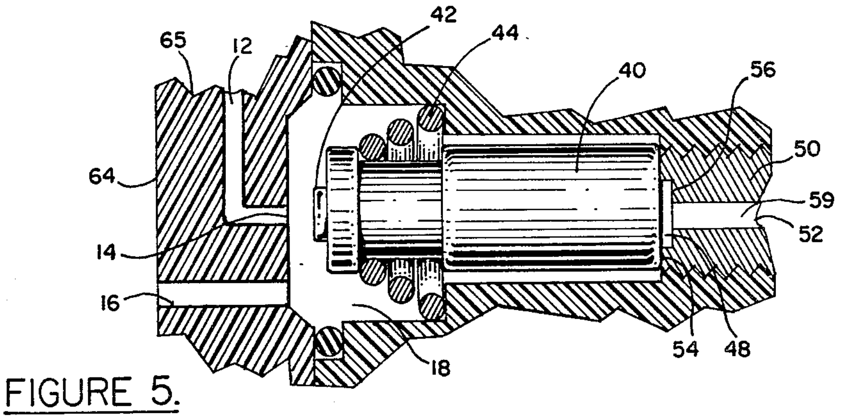
FIG. 5 shows the solenoid plunger assembly in the actuated position.

Referring also to FIG. 5 in the improvement of the invention, a recess 56 is provided in the surface of cap 50 which faces the back surface or plunger seat 48 of plunger 40. Recess 56 communicates with gas outlet passageway 59 which terminates with port 52 so that the space or cavity provided by the recess is exposed to atmospheric pressure. Thus, recess 56 forms an enlarged area of reduced pressure to which plunger seat surface 48 is exposed which causes the plunger to remain in a retracted position shown in FIG. 3 even though current to the solenoid coil has been terminated. It will be noted in FIG. 1 that gas outlet passageway 59 communicates with cavity 18 around the exterior surface of plunger 40, since the solenoid housing in which the plunger is located is oversized relative to the exterior dimensions of the plunger. Thus, there is a space around the plunger through which pressurized gas in cavity 18 attempts to escape through gas outlet passageway 59 since there is no other outlet port for the pressurized gas in the system to escape until piston 22 has reached its completely depressed position shown in FIG. 4. With recess 56 having an enlarged area exposed to plunger seat surface 48, as compared to the smaller dimensions or bore of gas outlet passageway 59, plunger seat surface 48 is exposed to a rather large, relatively low pressure area as compared to the gas pressure in the system at cavity 18 to which the remainder of the plunger is exposed. This relatively low atmospheric pressure in recess 56 and acting on plunger seat surface 48 is sufficient to overcome the bias of spring 44 and thus causes plunger 42 to remain in the retracted position illustrated in FIGS. 3 and 5. The plunger will remain in the retracted condition so long as pressure within the system including cavity 18 to which the plunger is exposed is enough greater than the ambient or atmospheric pressure in recess 59 to overcome the bias of spring 44.

The depth of recess 56 is not of substantial importance since it is the surface area of plunger seat surface 48 exposed to the relatively low ambient pressure that is critical in overcoming the bias of spring 44 in order to maintain plunger 40 in the retracted position. Thus, it is the area of the recess opening, the differential between the high pressure gas in the system and relatively low ambient pressure in recess 56, and the bias force of spring 44 that determine the ability of plunger 40 to remain retracted when the solenoid is deenergized. If the recess opening is not large enough, the plunger will not remain retracted; if it is too large relative to the plunger seat size, a suitable gas seal may not be formed. By way of example, where spring 44 has a nominal bias of two pounds and the pressure in the system is at least about 50 psi, a recess diameter of at least about 0.15 inch and preferably at least 0.175 inch, up to slightly less than the diameter of the plunger seat surface may be used. More preferably, highly effective results are obtained by using a recess diameter of 0.200 inch with a plunger seat diameter of 0.335 inch. If lower gas pressures in the system are used, the greater the area of the opening of the recess will have to be. Accordingly, one skilled in the art may determine the relative gas pressure differential, recess opening area, and plunger spring bias requirements necessary to keep the plunger retracted.

Once the solenoid plunger 40 has been retracted as previously described, plunger seat surface 48 will abut the surface of cap seat 54 to form a gas seal sufficient to maintain gas pressure in the system to fully depress piston 22. Although some slight gas leakage may occur between the cap seat and plunger seat surfaces, it will not be sufficient to substantially change the relative pressure differential between the recess and the system to cause the plunger to be moved forward by the plunger spring.

Once piston 22 has been fully depressed to the position shown in FIG. 4, with notch 62 communicating with gas pressure relief port 61, the gas pressure in the system is immediately dumped or relieved, whereby the pressure in the system is substantially equal to ambient pressure in recess 56. When that occurs, without an adequate required pressure between the front of the plunger and its surface 48, bias spring 44 forces the plunger forward to the position illustrated in FIG. 4, thereby again closing gas inlet port 14. Also, as the excess gas pressure in the system is relieved, piston 22 is returned to its retracted position illustrated in FIG. 2 by spring 36. As the piston is moved to the retracted position, it will draw liquor into liquid holding cavity 32 with ball 43 opening the liquid inlet port. As that occurs, ball 24 also closes port and valve seat 28.

The piston will travel to a retracted position limited by screw 66. The screw includes a stop plate 68 which will contact a portion of piston 22 to stop it at any desired preselected position, depending on the volume of liquid desired to be drawn into liquid holding cavity 32 during each stroke between the fully depressed and the retracted piston positions. Once the piston begins its travel toward the retracted position from the fully depressed position, notch 62 will pass out of communication with port 64 thereby again causing creation of a gas-tight seal along the outer surface of the piston guide shaft 60.

A number of the components described herein are similar in operation in dispensing liquor from the apparatus as described in my U.S. Pat. No. 4,157,772, and the description of those common components, including a hand-held dispenser gun and its actuation of the solenoid being incorporated herein by reference. Although the assembly of the invention has been described in use combined with a hand-held dispensing gun, other dispensers may be used. For example, automatic liquid dispensers utilizing the same equipment, and in which a predetermined amount of liquid is to be dispensed may be used with any type of actuation of the solenoid valve described herein. In addition, according to a preferred embodiment, any solenoid actuating system to be utilized with the improved assembly of the invention will create a current in the solenoid coil only for a time sufficient to retract solenoid plunger 40 and thereafter be automatically terminated. With such a relatively short energizing of the solenoid and with automatic termination, there will be no dependence of the system on how long an operator depresses a button on a dispenser gun, or how long any solenoid actuating means is depressed or closed. Thus, because of the automatic feature for maintaining solenoid plunger retraction according to the invention, once retraction has been initiated by the solenoid, precise functioning of the dispensing apparatus will occur. It will also be evident that because of the improvement of the solenoid apparatus not involving additional switching or substantial additional components, overall assembly simplification is achieved and maintenance problems are reduced. Other components or modification of those described herein within the purview of the invention will be evident to those skilled in the art.

I claim:

1. In a liquid dispenser in which liquid is alternately and selectively displaced from and drawn into a reservoir by a piston being driven therein between a first position in which the volume of said reservoir is expanded, and a second position in which said volume is contracted, said piston being urged to said first position by a piston biasing spring, and forced to said second position by pressurized gas in a chamber exposed to said piston, an improved assembly comprising:

a gas inlet for introducing pressurized gas into said chamber, a first and a second outlet for releasing gas from said chamber, a solenoid assembly having a solenoid plunger exposed to pressurized gas in said chamber, moveable between a first position for closing said gas inlet and a second position for closing said second outlet, and having a seat surface exposed to said second outlet, plunger biasing means for urging said plunger to said first position, solenoid means for moving said plunger to said second position and switching means cooperating therewith for momentarily energizing said solenoid means, said second outlet having an oversized recess exposed in said chamber to said plunger seat surface and communicating to atmospheric pressure through said second outlet, said recess having an area exposed to said plunger seat surface sufficient to maintain said plunger in said second position by overcoming said plunger biasing means when said chamber is pressurized, and closure means cooperating with said piston for maintaining said first outlet closed until said piston has substantially reached said second position, whereby said first outlet is opened, the gas pressure in said chamber is released, and said plunger is returned to said first position by said biasing means.

2. The assembly of claim 1 including a dispenser for said liquid and means for actuating said solenoid assembly.

3. The assembly of claim 1 wherein said second gas outlet comprises a substantially flat surfaced seat for creating a substantial gas seal with said plunger seat surface when said plunger is in said second position, a gas outlet port having a first cross-section area, and wherein said recess comprises a cavity defined between said flat surfaced seat and said gas outlet port and having a second cross-section area, said second cross-section area being larger than said first cross-section area.

4. The assembly of claim 1 wherein the area of said recess exposed to said seat surface is at least about 0.150 inch.

5. An assembly of claim 1 wherein said piston includes an elongated guide rod extending through said first outlet, said guide rod having a notch adjacent an end thereof opposite said piston, and said first outlet having gas sealing means cooperating with said guide rod for maintaining a substantial gas seal between said first outlet and said rod except at said notch.

6. The assembly of claim 5 wherein said notch is exposed at said first outlet where said piston has reached said second position.

7. The assembly of claim 1 including adjustable means for selectively varying the distance between said first and second position of said piston.

8. The assembly of claim 7 wherein said adjustable means comprises a screw member having a stop thereon exposed in said chamber for contacting said piston when said piston has reached said first position.

* * * * *